(12) United States Patent
Biskeborn et al.

(10) Patent No.: US 8,547,665 B2
(45) Date of Patent: Oct. 1, 2013

(54) MAGNETIC HEAD HAVING A MATERIAL FORMED IN ONE OR MORE RECESSES EXTENDING INTO THE MEDIA SUPPORT SURFACE OF AT LEAST ONE OF THE SUBSTRATE AND THE CLOSURE

(75) Inventors: Robert Glenn Biskeborn, Hollister, CA (US); Calvin Shyhjong Lo, Saratoga, CA (US); Gary Miles McClelland, Palo Alto, CA (US)

(73) Assignee: International Business Machines Corporation, Armonk, NY (US)

( * ) Notice: Subject to any disclaimer, the term of this patent is extended or adjusted under 35 U.S.C. 154(b) by 1357 days.

(21) Appl. No.: 11/969,073

(22) Filed: Jan. 3, 2008

(65) Prior Publication Data

US 2009/0174967 A1 Jul. 9, 2009

(51) Int. Cl.
*G11B 5/187* (2006.01)
*G11B 5/255* (2006.01)

(52) U.S. Cl.
USPC ............................ 360/317; 360/231; 360/122

(58) Field of Classification Search
USPC ............... 360/122, 231, 317, 119.03, 119.04, 360/119.07, 119.11, 230, 235.1, 235.2
See application file for complete search history.

(56) References Cited

U.S. PATENT DOCUMENTS

| | | | | |
|---|---|---|---|---|
| 4,897,747 A * | 1/1990 | Meunier et al. | ............... | 360/122 |
| 4,953,050 A | 8/1990 | Kumura et al. | ............... | 360/126 |
| 5,136,775 A * | 8/1992 | Onoe et al. | ................. | 29/603.12 |
| 5,285,340 A | 2/1994 | Ju et al. | ......................... | 360/119 |
| 5,313,356 A * | 5/1994 | Ohkubo et al. | ............ | 360/125.5 |
| 5,386,400 A * | 1/1995 | Nakayama et al. | ........ | 369/13.17 |
| 5,991,119 A * | 11/1999 | Boutaghou et al. | ........ | 360/234.7 |
| 6,198,600 B1 * | 3/2001 | Kitao et al. | ................ | 360/235.2 |
| 6,212,042 B1 * | 4/2001 | Gui et al. | .................... | 360/236.6 |
| 6,219,205 B1 | 4/2001 | Yuan et al. | ..................... | 360/319 |
| 6,239,948 B1 | 5/2001 | Wu et al. | ........................ | 360/120 |
| 6,381,098 B1 * | 4/2002 | Boutaghou et al. | ........ | 360/235.2 |
| 6,404,587 B1 | 6/2002 | Chaug et al. | ................... | 360/119 |
| 6,879,470 B2 * | 4/2005 | Johnson et al. | ............... | 360/317 |
| 7,483,244 B2 * | 1/2009 | Sato | ................................ | 360/319 |
| 7,864,489 B2 * | 1/2011 | Hirata et al. | ................... | 360/320 |
| 8,191,234 B2 * | 6/2012 | Biskeborn et al. | ......... | 29/603.11 |
| 2003/0099069 A1 * | 5/2003 | Kagami et al. | ................. | 360/313 |
| 2003/0112555 A1 | 6/2003 | Sato et al. | ...................... | 360/126 |
| 2005/0207069 A1 * | 9/2005 | Suda | .............................. | 360/323 |
| 2006/0044691 A1 * | 3/2006 | Nakamura et al. | ......... | 360/235.1 |
| 2006/0232883 A1 * | 10/2006 | Biskeborn et al. | ............ | 360/129 |
| 2007/0188913 A1 * | 8/2007 | Yamamoto | ................. | 360/97.01 |

FOREIGN PATENT DOCUMENTS

| | | | | |
|---|---|---|---|---|
| JP | 58141428 A | * | 8/1983 |
| JP | 59-186114 A | * | 10/1984 |
| JP | 59207418 A | * | 11/1984 |
| JP | 62277607 A | * | 12/1987 |
| JP | 62298008 A | * | 12/1987 |
| JP | 63000806 A | * | 1/1988 |

(Continued)

*Primary Examiner* — Julie Anne Watko
(74) *Attorney, Agent, or Firm* — Zilka-Kotab, PC

(57) ABSTRACT

In one embodiment, a magnetic head includes a substrate having a media support surface; a gap coupled to the substrate, the gap having at least one of a magnetoresistive (MR) sensor and a writer; a closure coupled to the gap on a side thereof opposite the substrate, said closure forming a portion of the media support surface; and a material formed in one or more recesses extending into the media support surface of at least one of the substrate and the closure.

18 Claims, 9 Drawing Sheets

(56) References Cited

FOREIGN PATENT DOCUMENTS

| JP | 63000808 A | * | 1/1988 |
| JP | 01138604 A | * | 5/1989 |
| JP | 01211309 A | * | 8/1989 |
| JP | 01260613 A | * | 10/1989 |
| JP | 02035613 A | * | 2/1990 |
| JP | 03116408 A | * | 5/1991 |
| JP | 04023215 A | * | 1/1992 |

* cited by examiner

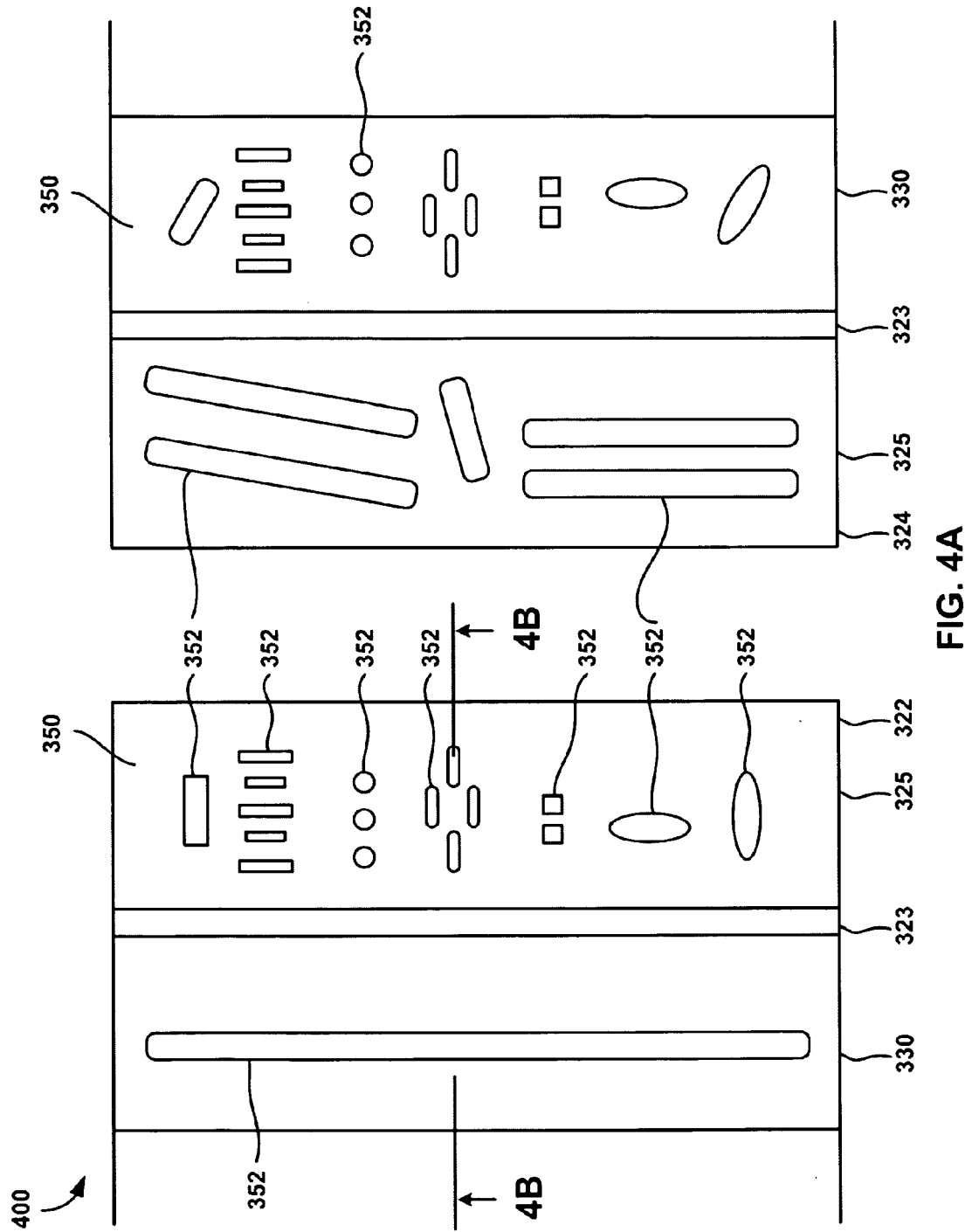

MAGNETIC HEAD HAVING A MATERIAL FORMED IN ONE OR MORE RECESSES EXTENDING INTO THE MEDIA SUPPORT SURFACE OF AT LEAST ONE OF THE SUBSTRATE AND THE CLOSURE

FIELD OF THE INVENTION

The present invention relates to data storage systems, and more particularly, this invention relates to a magnetic head having filled areas.

BACKGROUND OF THE INVENTION

In magnetic storage systems, data is commonly read from and written onto magnetic recording media utilizing magnetic transducers. Data is written on the magnetic recording media by moving a magnetic recording transducer to a position over the media where the data is to be stored. The magnetic recording transducer then generates a magnetic field, which encodes the data into the magnetic media. Data is read from the media by similarly positioning the magnetic read transducer and then sensing the magnetic field of the magnetic media. Read and write operations may be independently synchronized with the movement of the media to ensure that the data can be read from and written to the desired location on the media.

An important and continuing goal in the data storage industry is that of increasing the density of data stored on a medium. For tape storage systems, that goal has lead to increasing the track density on recording tape, and decreasing the thickness of the magnetic tape medium. However, the development of small footprint, higher performance tape drive systems has created various problems in the design of a tape head assembly for use in such systems.

In a tape drive system, magnetic tape is moved over the surface of the tape head at high speed. This movement generally entrains a film of air between the head and tape. Usually the tape head is designed to minimize the spacing between the head and the running tape. Minimizing the spacing between the magnetic head and the magnetic tape is crucial for ensuring that the recording gaps of the writing transducers, which are the source of the magnetic recording flux, have maximum writing effectiveness, and for ensuring that the read elements are able to read back the highest frequency content.

However, this close spacing has resulted in various tribological issues, among them, increased tape/head friction and stiction, debris accumulation, head wear, gap erosion, and sensor and shield corrosion.

For tape heads, sensors can be recessed and flux guided, but flux guides have not worked well due to head processing difficulty and to spacing loss. Alternatively, GMR heads, which are much more susceptible to corrosion effects than AMR heads, may be fabricated using materials that have improved corrosion resistance, but GMR heads built from these materials may not provide optimal magnetic performance (amplitude in particular). Head-media friction and stiction are usually addressed by making the media rougher, but this may adversely affect the signal-to-noise ratio and thus detection capability and ultimately areal density.

SUMMARY OF THE INVENTION

In one embodiment, a magnetic head includes a substrate having a media support surface; a gap coupled to the substrate, the gap having at least one of a magnetoresistive (MR) sensor and a writer; a closure coupled to the gap on a side thereof opposite the substrate, said closure forming a portion of the media support surface; and a material formed in one or more recesses extending into the media support surface of at least one of the substrate and the closure.

In another embodiment, a magnetic head comprises a substrate having a media support surface; a gap coupled to the substrate, the gap having at least one of a magnetoresistive (MR) sensor and a writer, wherein the gap has a gap profile recessed from the media support surface; a laminate layer formed above the recessed gap profile, the laminate layer comprising an electrically insulating layer formed adjacent the gap profile; and a closure coupled to the gap on a side thereof opposite the substrate, said closure forming a portion of the media support surface.

In yet another embodiment, a magnetic head comprises a substrate having a media support surface; a gap coupled to the substrate, the gap having at least one of a magnetoresistive (MR) sensor and a writer, wherein the gap has a gap profile recessed from the media support surface; a layer formed above the recessed gap profile; a closure coupled to the gap on a side thereof opposite the substrate, said closure forming a portion of the media support surface; and a material formed in at least one recess extending into the media support surface of at least one of the substrate and the closure.

In a further embodiment, a magnetic head comprises a substrate having a media support surface; a gap coupled to the substrate, the gap having at least one of a magnetoresistive (MR) sensor and a writer, wherein the gap has a gap profile recessed from the media support surface; a layer formed above the recessed gap profile; a closure coupled to the gap on a side thereof opposite the substrate, said closure forming a portion of the media support surface; and a material formed in recesses extending into the media support surface of the substrate and the closure.

Other aspects and advantages of the present invention will become apparent from the following detailed description, which, when taken in conjunction with the drawings, illustrate by way of example the principles of the invention.

BRIEF DESCRIPTION OF THE DRAWINGS

For a fuller understanding of the nature and advantages of the present invention, as well as the preferred mode of use, reference should be made to the following detailed description read in conjunction with the accompanying drawings.

FIG. 4A is a partial tape bearing surface view of a magnetic head according to one embodiment of the present invention.

DETAILED DESCRIPTION

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

The following description discloses several preferred embodiments of data storage systems, as well as operation and/or component parts thereof.

In one general embodiment, a magnetic head includes a substrate having a media support surface; a gap coupled to the substrate, the gap having at least one of a magnetoresistive (MR) sensor and a writer; a closure coupled to the gap on a side thereof opposite the substrate, said closure forming a portion of the media support surface; and a material formed in one or more recesses which extend into the media support surface of at least one of the substrate and the closure.

In another general embodiment, a magnetic head comprises a substrate having a media support surface; a gap coupled to the substrate, the gap having at least one of a magnetoresistive (MR) sensor and a writer, wherein the gap has a gap profile recessed from the media support surface; a laminate layer formed above the recessed gap profile, the laminate layer comprising an electrically insulating layer formed adjacent the gap profile; and a closure coupled to the gap on a side thereof opposite the substrate, said closure forming a portion of the media support surface.

In yet another general embodiment, a magnetic head comprises a substrate having a media support surface; a gap coupled to the substrate, the gap having at least one of a magnetoresistive (MR) sensor and a writer, wherein the gap has a gap profile recessed from the media support surface; a layer formed above the recessed gap profile; a closure coupled to the gap on a side thereof opposite the substrate, said closure forming a portion of the media support surface; and a material formed in at least one recess extending into the media support surface of at least one of the substrate and the closure.

In a further general embodiment, a magnetic head comprises a substrate having a media support surface; a gap coupled to the substrate, the gap having at least one of a magnetoresistive (MR) sensor and a writer, wherein the gap has a gap profile recessed from the media support surface; a layer formed above the recessed gap profile; a closure coupled to the gap on a side thereof opposite the substrate, said closure forming a portion of the media support surface; and a material formed in recesses extending into the media support surface of the substrate and the closure.

Figure 1:
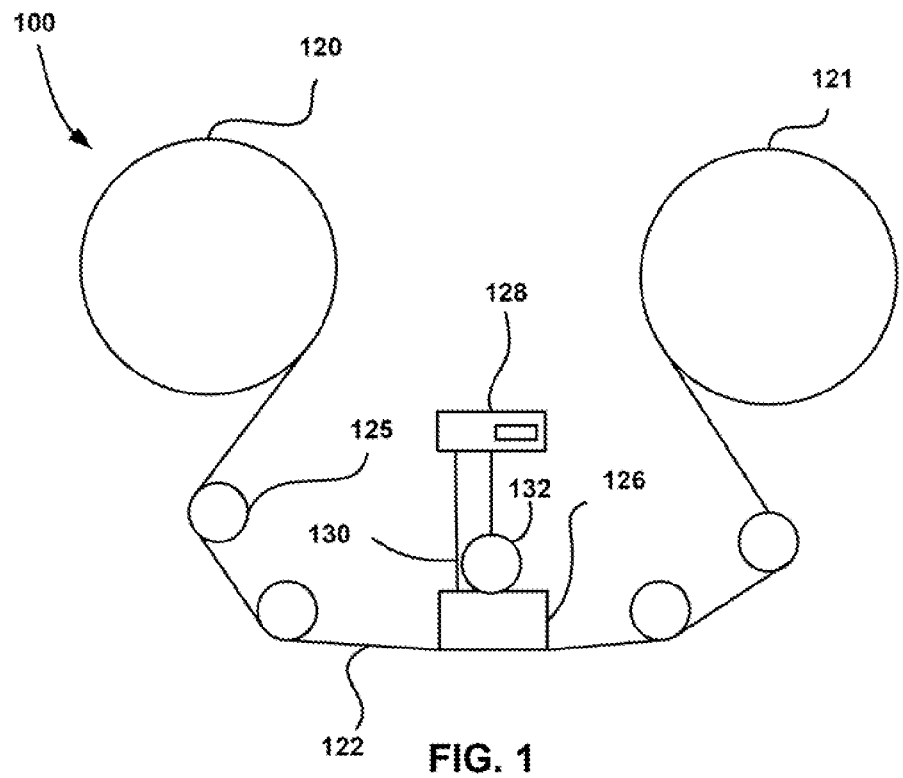
FIG. 1 is a schematic diagram of a simplified tape drive system according to one embodiment.

FIG. 1 illustrates a simplified tape drive 100 of a tape-based data storage system, which may be employed in the context of the present invention. While one specific implementation of a tape drive is shown in FIG. 1, it should be noted that the embodiments described herein may be implemented in the context of any type of tape drive system.

As shown, a tape supply cartridge 120 and a take-up reel 121 are provided to support a tape 122. One or more of the reels may form part of a removable cassette and are not necessarily part of the system 100. The tape drive, such as that illustrated in FIG. 1, may further include drive motor(s) to drive the tape supply cartridge 120 and the take-up reel 121 to move the tape 122 over a tape head 126 of any type.

Guides 125 guide the tape 122 across the tape head 126. Such tape head 126 is in turn coupled to a controller assembly 128 via a cable 130. The controller 128 typically controls head functions such as servo following, writing, reading, etc. The cable 130 may include read/write circuits to transmit data to the head 126 to be recorded on the tape 122 and to receive data read by the head 126 from the tape 122. An actuator 132 controls position of the head 126 relative to the tape 122.

An interface may also be provided for communication between the tape drive and a host (integral or external) to send and receive the data and for controlling the operation of the tape drive and communicating the status of the tape drive to the host, all as will be understood by those of skill in the art.

Figure 2:
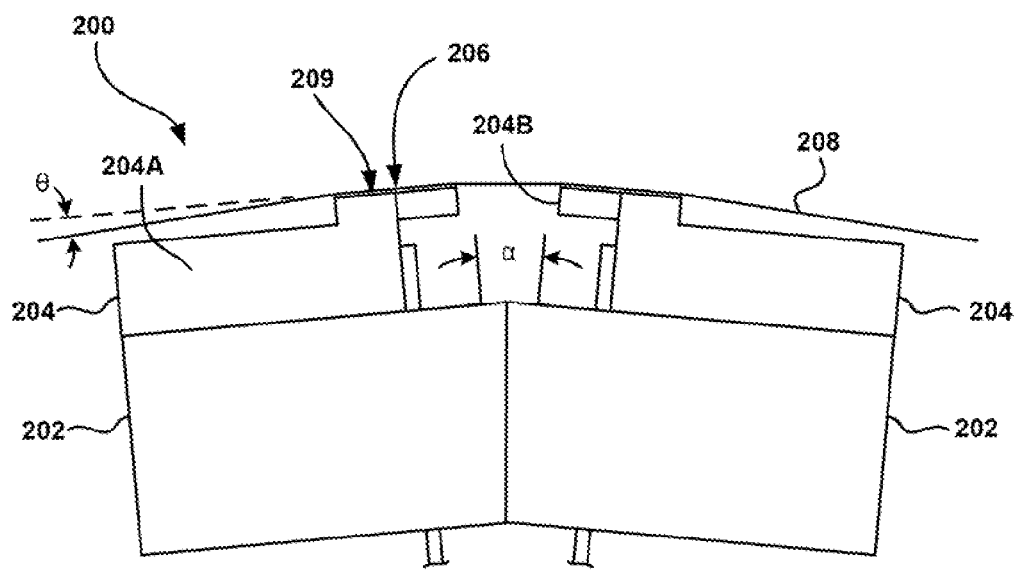
FIG. 2 illustrates a flat-lapped bi-directional, two-module magnetic tape head which may be implemented in the context of the present invention.

By way of example, FIG. 2 illustrates a flat-lapped bi-directional, two-module magnetic tape head 200 which may be implemented in the context of the present invention. As shown, the head includes a pair of bases 202, each equipped with a module 204, and fixed at a small angle α with respect to each other. The bases are typically "U-beams" that are adhesively coupled together. Each module 204 includes a substrate 204A and a closure 204B with a gap 206 comprising readers and/or writers situated therebetween. In use, a tape 208 is moved over the modules 204 along a media (tape) bearing surface 209 in the manner shown for reading and writing data on the tape 208 using the readers and writers. The wrap angle θ of the tape 208 at edges going onto and exiting the flat media support surfaces 209 are usually between 0.1 degree and 5 degrees.

The substrates 204A are typically constructed of a wear resistant material, such as a ceramic. The closures 204B may be made of the same or similar ceramic as the substrates 204A.

The readers and writers may be arranged in a piggyback configuration. The readers and writers may also be arranged in an interleaved configuration. Alternatively, each array of channels may be readers or writers only. Any of these arrays may contain one or more servo readers.

Figure 3:
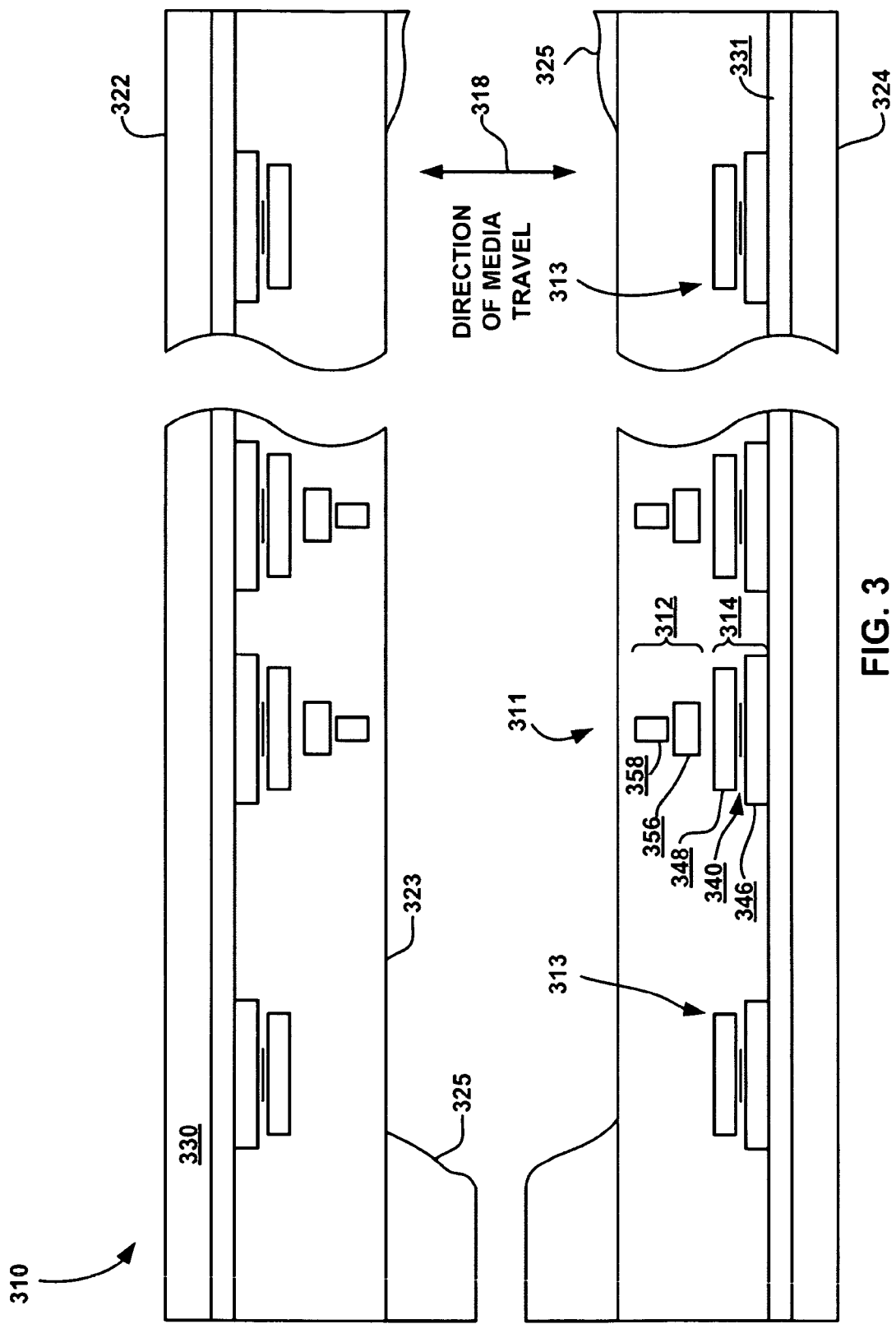
FIG. 3 is a partial tape bearing surface view of a magnetic tape head according to one embodiment.

FIG. 3 shows a partial tape bearing surface (TBS) view of a magnetic tape head assembly 310 according to one embodiment having a plurality of read/write (R/W) pairs in a piggyback configuration formed on a common substrate 330 and an optional electrically insulative layer 331. The writers, exemplified by the write head 312 and the readers, exemplified by the read head 314, are aligned parallel to a direction of travel of a tape medium thereacross to form a R/W pair, exemplified by the R/W pair 311.

Several R/W pairs 311 may be present, such as 8, 16, 32 pairs, etc. The R/W pairs 311 as shown are linearly aligned in a direction generally perpendicular to a direction of tape travel thereacross. However, the pairs may also be aligned diagonally, etc. Servo readers 313 are positioned on the outside of the array of R/W pairs, the function of which is well known.

Generally, the magnetic tape medium moves in either a forward or reverse direction as indicated by arrow 318. The magnetic tape medium and head assembly 310 operate in a transducing relationship in the manner well-known in the art. The piggybacked MR head assembly 310 includes two thin-film modules 322 and 324 of generally identical construction.

Modules 322 and 324 are joined together with a space present between closures 325 thereof (partially shown) to form a single physical unit to provide read-while-write capability by activating the writer of the leading module and reader of the trailing module aligned with the writer of the leading module parallel to the direction of tape travel relative thereto. When a module 322, 324 of a piggyback head 310 is constructed, layers are formed in the gap 323 created above an electrically conductive substrate 330 (partially shown), e.g., of AlTiC, in generally the following order for the R/W pairs 311: an insulating layer 331, a first shield 346 typically of an iron alloy such as NiFe (permalloy, e.g., 80/20 Permalloy), CZT or Al—Fe—Si (Sendust), a sensor 340 for sensing a data track on a magnetic medium, a second shield 348 of the same or different material than the first shield, first and second writer pole tips 356, 358, and a coil (not shown).

The first and second writer poles 356, 358 may be fabricated from high magnetic moment materials such as 45/55 NiFe. Note that these materials are provided by way of example only, and other materials may be used. Additional layers such as insulation between the shields and/or pole tips and an insulation layer surrounding the sensor may be present. Illustrative materials for the insulation include alumina and other oxides, insulative polymers, etc.

Figure 4B:
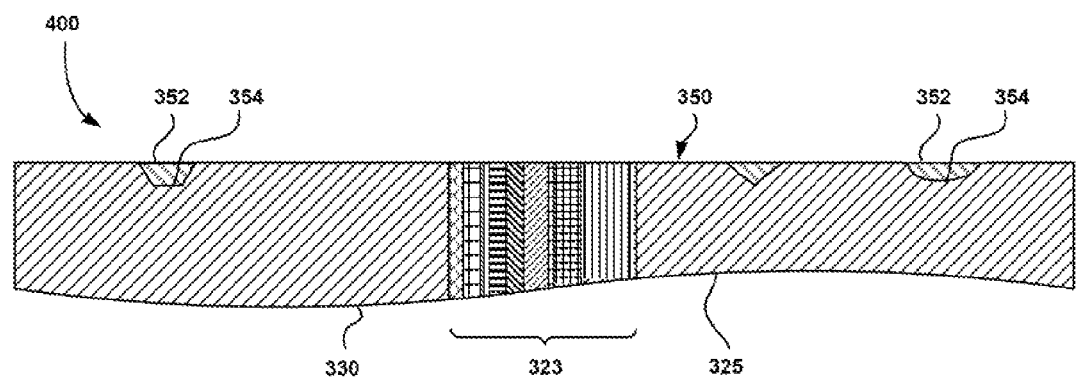
FIGS. 4B-4E are partial cross sectional views of a magnetic head according to one embodiment of the present invention.
Figure 4C:
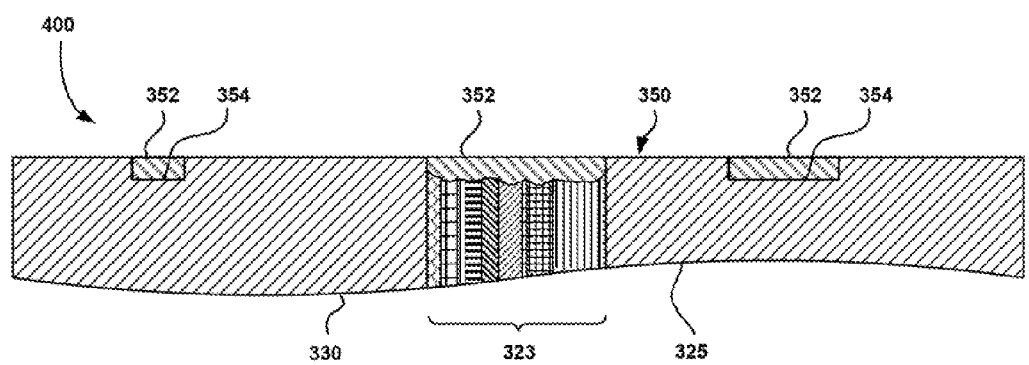

FIG. 4A is a partial tape bearing surface of a magnetic head 400 according to one embodiment. FIGS. 4B-4C are partial cross sectional views taken along line 4B-4B of FIG. 4A. As shown, the head includes modules 322, 324, each module comprising a substrate 330 having a media support surface 350. Note that the media support surface 350 need not actually engage the magnetic media, as in embodiments where an air bearing is typically formed between the head and media.

With continued reference to FIG. 4A and 4B, a gap 323 is coupled to the substrate 330, the gap 323 having at least one of a magnetoresistive (MR) sensor and a writer. A closure 325 is coupled to the gap 323 on a side thereof opposite the substrate 330, the closure 325 forming a portion of the media support surface 350. A material 352 is formed in one or more recesses 354 extending into the media support surface of the substrate 330, the closure 325, or both. For demonstrative purposes, many different shapes and variations of the recesses 354 are shown to exemplify the various permutations and variants that form the multitude of possible embodiments that fall within the present description.

FIG. 4C depicts a variation in which the gap 323 has as gap profile that is also recessed from the media support surface and is filled with a material 352. In such an embodiment, the material 352 in the gap 323 is preferably nonmagnetic so as not to interfere with reading/writing operations, and either electrically insulating or a laminate layer as described in more detail below. While various portions of the gap 323 are shown as being more eroded, those skilled in the art will appreciate that the process used to recess the gap 323 may be tuned to exhibit an opposite effect.

Also note that the profiles of the recesses may take any shape resulting from the processing that created the recesses. For example, in FIG. 4B some recesses are shown with angled edges, while another has rounded edges. In the example of FIG. 4C, the edges of the recesses are more parallel.

In any of the embodiments described herein, the materials 352 used to fill the recesses 354 and/or recessed gap 323 may have the same composition in all areas, or may be different in different areas of the head. Different materials could even be used in each recess or group of recesses.

In some embodiments, the material includes a metal, e.g., may be a pure metal, a metal alloy, or may include metallic components. Such materials provide high durability. Illustrative metal-containing materials include NiFe (e.g., 45/55), AlFeSi (Sendust), tantalum, tungsten, titanium, etc.

In other embodiments, the material exhibits less tendency for head/media stiction than the surrounding media support surface. Alternatively, or in combination with anti-stiction properties, the material may exhibit less head/media friction than the surrounding media support surface. Again, metals and metal alloys may be used. In one preferred embodiment, the material is a fluorinated material such as fluorinated diamond like carbon, which greatly reduces stiction while providing excellent wear resistance.

In further embodiments, the material may include silicon carbide, silicon nitride, diamond like carbon (DLC), and many others. Selection of the desired shapes and dimensions of the recesses may be based on tribological factors. For example, stiction may be altered by forming the recesses and adding material to the head wafer portions (e.g., substrate), and in the case of tape heads, optional closure portions. The optimal pattern geometry may be determined by the head-media interaction. Many exemplary recess shapes are described herein, such as rectangular, square, elliptical, irregular, etc. Furthermore, the spacing of the recesses in a particular pattern may be adjusted and varied in all directions depending on the application. For example tape head patterns may accommodate aerodynamic requirements, as understood by those skilled in the art of tape head design. For example, stiction may be altered by patterning head wafer portions, and in the case of tape heads, optional closure portions.

Recesses on the substrate and/or closure are preferably between about 10 and about 70 nanometers deep in a direction perpendicular to the media bearing surface, and are preferably between about 0.1 and about 25 microns wide in directions parallel to the media bearing surface. The gap may be recessed by about 10 to about 50 nanometers deep in a direction perpendicular to the media bearing surface. These ranges are illustrative only, and the depth and/or width may be larger or smaller than those presented here.

As shown in FIG. 4A, the recesses may take any desired shape and orientation. Illustrative shapes include square, rectangular, oval shaped, circular, elliptical, arcuate, etc. In one embodiment, the length of a recess at the media bearing surface in a direction orthogonal to the media motion direction may be greater than the width. The lands between recesses in the direction of media motion may be comparable to width or greater.

In one approach, a recess is elongated, where an axis thereof is oriented at an angle of between 0 and 90 degrees from a line parallel to a direction of tape travel across the media support surface. In another approach, a recess is elongated, where an axis thereof is oriented about parallel to a direction of tape travel across the media support surface. Accordingly, a recess can be oriented at about any angle relative to the direction of tape travel across the media support surface.

Figure 4D:
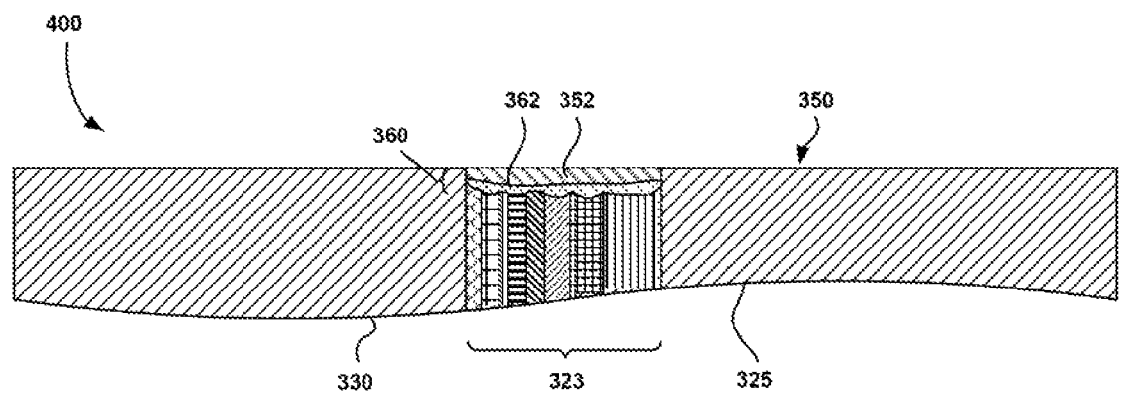

FIG. 4D illustrates another variation of a magnetic head 400 having a laminate layer 360 formed above the recessed gap profile, the laminate layer 360 comprising an electrically insulating layer 362 formed adjacent the gap profile. A layer of material 352 may be formed above the electrically insulating layer 362. In contrast to the embodiment of FIG. 4B and 4C, neither the closure nor the substrate has recesses with material therein in the embodiment shown in FIG. 4D. However, it should again be emphasized that the substrate, closure, or both may also have filled recesses therein.

Illustrative materials of which the electrically insulating layer 362 may be formed include metal oxides such as alumina, etc. The layer of material 352 may be any material, including those listed above, except that magnetic materials may not be appropriate where they would interfere with operation of the transducers to read and/or write to the media.

In one approach, the laminate layer 360 comprises a nonmagnetic electrically conductive layer of material 352 formed above the electrically insulating layer 362. Again, illustrative materials are nonmagnetic metals, alloys, materials incorporating such metals, etc. In one approach, the layer of material 352 is AlFeSi (Sendust). If AlFeSi is not annealed, it is very hard (durable), nonmagnetic, and electrically conductive.

In another approach, the laminate layer 360 includes a fluorinated material 352, the fluorinated material forming a portion of the media support surface.

While two layers are shown in the laminate layer 360, more layers may be added.

Figure 4E:
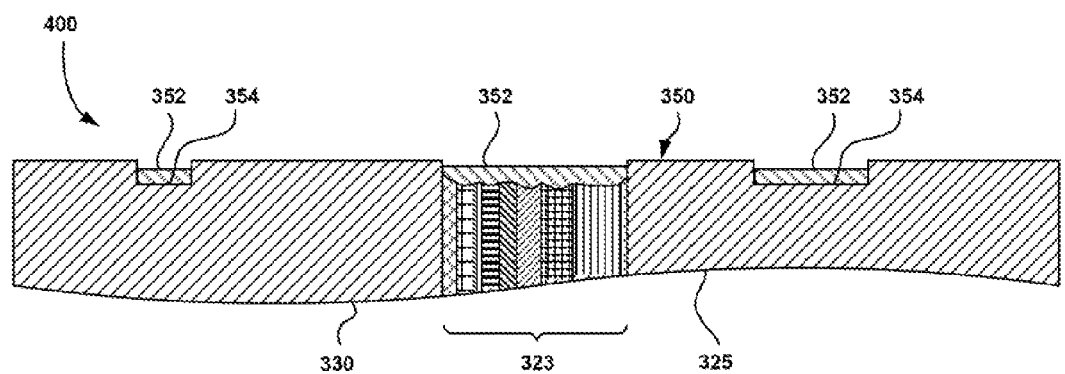

FIG. 4E illustrates yet another variation in which the material 352 added to the recesses 354 and/or recessed gap profile is underfilled such that the material 352 does not quite extend to the media support surface 350.

Accordingly, several embodiments have been described that include a new interface that protects the transducers form wear and corrosion, resists friction and/or stiction, or both. In preferred embodiments, this new interface does not significantly increase transducer-media separation.

The various embodiments and their permutations and variations may be formed by any process known in the art. In preferred approaches, the media support surface of the head is processed to recess portions thereof, filled, and polished using processes that are well known and easily implemented in manufacturing with low cost and high yield.

Figure 5A:
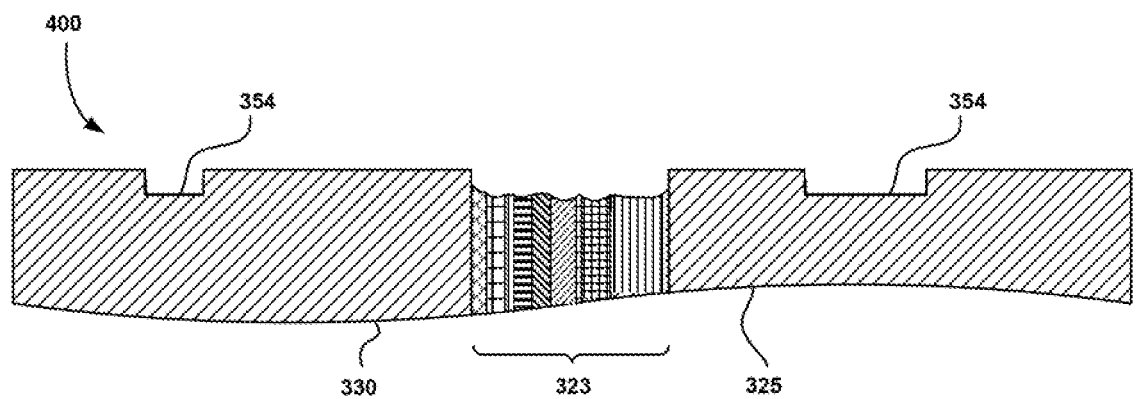
FIGS. 5A and 5B are partial cross sectional views of a magnetic head.
Figure 5B:
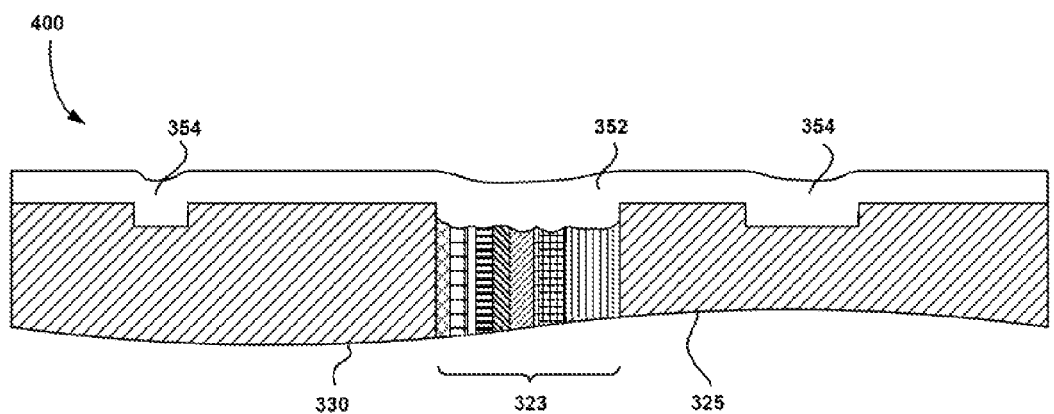

FIGS. 5A-B along with FIG. 4C are cross-secional views of the gap 323, substrate 330 and closure 325 of the head 400 of FIG. 4A illustrating the gap region at various stages of fabrication of the filled-gap recording head, according to one approach.

Referring to FIG. 5A, the recesses 354 and/or recessed gap profile are formed by patterning and material removal. The patterning may be performed by masking and ion-milling, reactive ion etching (RIE), sputter etching, chemical etching, ashing, chem-mech polishing, chrome tape lapping, or other means.

Referring to FIG. 5B, a material 352 is added to the recesses 354 and/or recessed gap profile. The material 352 may be vacuum deposited, plated, laminated, etc. Further, where different materials are used to fill different portions, e.g., NiFe in the recesses 354 and alumina and AlFeSi above the gap 323, one portion may be masked while the exposed portions are filled, then the unfilled portions unmasked and filled.

As shown, the material 352 is overfilled. However, as noted above with reference to FIG. 4E, the material may be underfilled.

Referring to FIG. 4C, after deposition, the material 352 is planarized down to the original head surface, and/or to form a flat or curved media support surface 350, thereby leaving the fill material 352 only in the gap 323 and/or recesses 354. The material may be removed by polishing or other Damascene process. Depending on whether the material was overfilled or underfilled, the material 352 may partially or completely fill the recess over the gap 323 and/or recesses 354. In a variation, a thin layer of the material 352 may be left over the media support surface 350.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A magnetic head, comprising:
a substrate having a media support surface;
a gap coupled to the substrate, the gap having at least one of a magnetoresistive (MR) sensor and a writer;
a closure coupled to the gap on a side thereof opposite the substrate, said closure forming a portion of the media support surface; and
an electrically conductive material formed in one or more recesses extending into the media support surface of at least one of the substrate and the closure,
wherein a length of each of the one or more recesses is defined between opposite ends thereof positioned farthest apart, wherein the length of each of the one or more recesses is less than a width of the substrate measured in a direction perpendicular to a direction of tape travel thereacross,
wherein the gap has a gap profile recessed from the media support surface, and further comprising a nonmagnetic material formed in a recess defined between the gap profile and a plane of the media support surface.

2. A head as recited in claim 1, wherein the material includes at least one of a metal and a fluorinated material.

3. A head as recited in claim 1, wherein the material is underfilled, wherein an upper surface of the material does not extend to the media support surface of the at least one of the substrate and closure.

4. A head as recited in claim 1, wherein the length of each of the one or more recesses is less than half the width of the substrate.

5. A head as recited in claim 1, wherein each of the one or more recesses is between about 10 and about 50 nanometers deep from the media bearing surface, wherein each of the one or more recesses is between about 0.1 and about 20 microns wide.

6. A head as recited in claim 1, wherein the one or more recesses is elongated, wherein an axis thereof is oriented at an angle of between 1 and 90 degrees from a line parallel to a direction of tape travel across the media support surface.

7. A head as recited in claim 1, wherein the one or more recesses is elongated, wherein an axis thereof is oriented about parallel to a direction of tape travel across the media support surface.

8. A head as recited in claim 1, wherein the nonmagnetic material is electrically conductive.

9. A head as recited in claim 1, wherein the one or more recesses are formed in the substrate.

10. A head as recited in claim 1, wherein the one or more recesses are formed in the closure.

11. A head as recited in claim 1, wherein the one or more recesses are formed in both the substrate and the closure.

12. A magnetic data storage system, comprising:
a magnetic head as recited in claim 1;
a drive mechanism for passing a magnetic recording tape over the head; and
a controller electrically coupled to the head.

13. A magnetic tape head, comprising:
a substrate having a tape support surface;
a gap coupled to the substrate, the gap having at least one of a magnetoresistive (MR) sensor and a writer, wherein the gap has a gap profile recessed from the tape support surface;
a laminate layer formed in a recess defined between the gap profile and a plane of the tape support surface, the laminate layer comprising an electrically insulating layer formed adjacent the gap profile and at least one additional layer; and
a closure coupled to the gap on a side thereof opposite the substrate, said closure forming a portion of the tape support surface.

14. A head as recited in claim 13, wherein the at least one additional layer of the laminate layer further comprises a nonmagnetic electrically conductive layer formed above the electrically insulating layer.

15. A head as recited in claim 13, wherein the at least one additional layer of the laminate layer includes a fluorinated material, the fluorinated material forming a portion of the tape support surface.

16. A magnetic data storage system, comprising:
a magnetic head as recited in claim 13;
a drive mechanism for passing a magnetic recording tape over the head; and
a controller electrically coupled to the head.

17. A magnetic head, further comprising:
a substrate having a media support surface;
a gap coupled to the substrate, the gap having at least one of a magnetoresistive (MR) sensor and a writer, wherein the gap has a gap profile recessed from the media support surface;
an electrically conductive layer formed in a recess defined between the gap profile and a plane of the media support surface;
a closure coupled to the gap on a side thereof opposite the substrate, said closure forming a portion of the media support surface;
a material formed in at least one recess extending into the media support surface of at least one of the substrate and the closure; and
an electrically insulating layer positioned between the electrically conductive layer and the gap profile, wherein the magnetic head is a tape head.

18. A magnetic tape head, comprising:
a substrate having a tape support surface;
a gap coupled to the substrate, the gap having at least one of a magnetoresistive (MR) sensor and a writer, wherein the gap has a gap profile recessed from the tape support surface;
at least two layers formed in a recess defined between the gap profile and a plane of the tape support surface, one of the layers being an electrically insulating layer formed adjacent the gap profile and a nonmagnetic electrically conductive layer formed above the electrically insulating layer;
a closure coupled to the gap on a side thereof opposite the substrate, said closure forming a portion of the tape support surface; and
a material formed in recesses extending into the tape support surface of the substrate and the closure,
wherein a length of each of the recesses is defined between opposite ends of the respective recess, wherein the length of each of the recesses is less than a width of the substrate measured in a direction perpendicular to a direction of tape travel thereacross.

* * * * *